United States Patent [19]

Bergeron et al.

[11] Patent Number: 4,602,971
[45] Date of Patent: Jul. 29, 1986

[54] PAPER PATCH AND METHOD FOR PATCHING HOLES IN PAPER WEBS

[75] Inventors: Joseph A. Bergeron, Franklin, Va.; Carl M. Hoffman, East Berlin, Pa.

[73] Assignee: Adhesives Research Incorporated, Glen Rock, Pa.

[21] Appl. No.: 700,228

[22] Filed: Feb. 11, 1985

[51] Int. Cl.⁴ .............................................. B32B 35/00
[52] U.S. Cl. ...................................... 156/94; 156/289; 156/291; 428/40; 428/63; 428/66; 428/194
[58] Field of Search .......................... 156/94, 289, 291; 428/40, 63, 66, 194; 29/402.09

[56] References Cited

U.S. PATENT DOCUMENTS

| | | | |
|---|---|---|---|
| 941,047 | 11/1909 | Shelton | 428/64 |
| 2,838,421 | 6/1958 | Sohl | 428/248 |
| 3,152,940 | 10/1964 | Abel et al. | 156/157 |
| 3,441,430 | 4/1969 | Peterson | 428/354 |
| 3,556,835 | 1/1971 | Sorell | 428/354 |
| 3,661,874 | 5/1972 | Olson | 525/329 |
| 3,865,770 | 2/1975 | Blake | 524/187 |
| 4,135,017 | 1/1979 | Hoffmann | 428/78 |
| 4,358,498 | 11/1982 | Parker | 428/108 |
| 4,413,080 | 11/1983 | Blake | 524/187 |
| 4,420,520 | 12/1983 | Jones et al. | 428/40 X |

Primary Examiner—Robert A. Dawson

[57] ABSTRACT

Patch assemblies for use in patching holes in a paper web includes a recyclable paper patch which is adapted to be stripped from a release coated carrier and adhesively secured to the paper web over a hole so that the area over the hole is free of exposed adhesive.

10 Claims, 3 Drawing Figures

PAPER PATCH AND METHOD FOR PATCHING HOLES IN PAPER WEBS

TECHNICAL FIELD

The field of this invention relates to patching holes in paper webs.

BACKGROUND OF THE INVENTION

The web which is produced on a papermaking machine sometimes includes holes which result from the formation process or because of contaminants which come into contact with the web. These holes can cause web tears, wrinkles, and coating, printing and converting problems.

The conventional way to eliminate these holes from the web involves making two parallel transverse cuts through the web on either side of the hole and removing the cut out portion and splicing the web back together, e.g. using a double or single side adhesive coated tape. This conventional method has several disadvantages including downtime resulting in bottlenecks, waste which must be recycled, possibility of wrinkles at the splice, and the need for changing line tension in roll formation which can result in production slow down.

SUMMARY OF THE INVENTION

It has been discovered herein that the aforementioned disadvantages are eliminated resulting in substantially increased production rates in papermaking and secondary processing by using a recyclable paper patch which is adapted to be adhesively secured to a paper web over a hole so that the area over the hole is free of exposed adhesive.

In particular, there is provided herein an assembly for use in patching holes in a paper web, said assembly comprising (a) a release coated carrier, and (b) a patch having a lower surface adjacent said carrier which has an exposable adhesive coating surrounding an exposable adhesive free portion adapted to be positioned to overlie at least a hole to be patched, said patch and said adhesive coating being recyclable in a papermaking process. The portion adapted to overlie at least a hole to be patched must overlie the hole and can overlie a portion of the web adjacent the hole. The surrounding adhesive coating must be of sufficient area to hold the patch on the web after application thereto. Preferably the patch comprises a patch layer and an additional layer (sometimes referred to herein as a barrier layer) which is attached over a portion of the underside of the patch layer between the patch layer and the release coated carrier to present an adhesive free area when the patch is stripped from the release coated carrier, constituting the exposable adhesive free portion adapted to be positioned to overlie at least a hole to be patched.

The method herein for patching a hole in a paper web comprises the steps of (a) providing a patch having an underside with an exposed adhesive coated area surrounding a non adhesive area, (b) positioning the patch opposite said web with its underside toward said web and aligning said non adhesive area over the hole to be patched; and (c) pressing said patch against said web to cover said hole so that the patch is adhesively secured to said web and so that said non adhesive area covers said hole.

DETAILED DESCRIPTION

Figure 1:
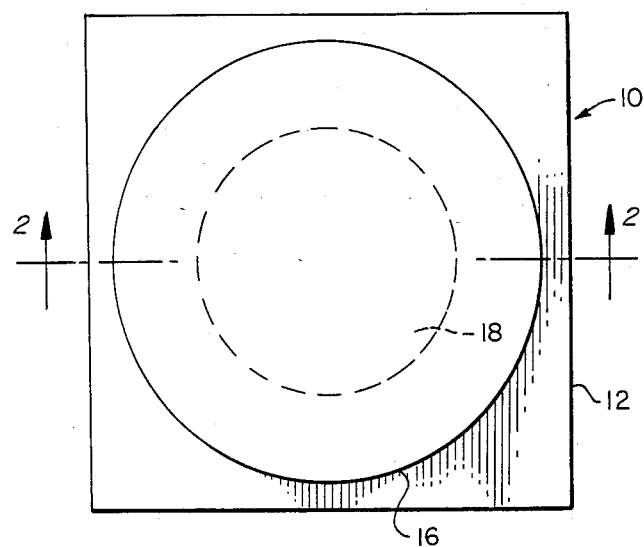
FIG. 1 is a plan view of a preferred patch assembly within the scope of the invention.
Figure 2:
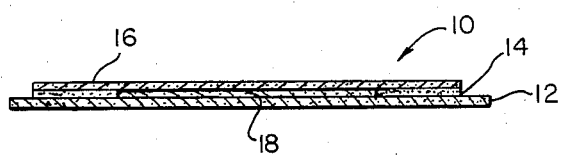
FIG. 2 is a vertical sectional view on line 2—2 of FIG. 1.

With continuing reference to the FIGS. 1 and 2 of the drawings, there is depicted a patch assembly 10 including a substantially square coated carrier layer 12 having releasably secured thereto by an adhesive layer 14 (FIG. 2) a circular patch layer 16. A circular barrier layer 18 positioned between carrier layer 12 and patch layer 16 and secured to the underside of layer 18 provides an adhesive free surface for positioning over a hole to be patched.

Figure 3:
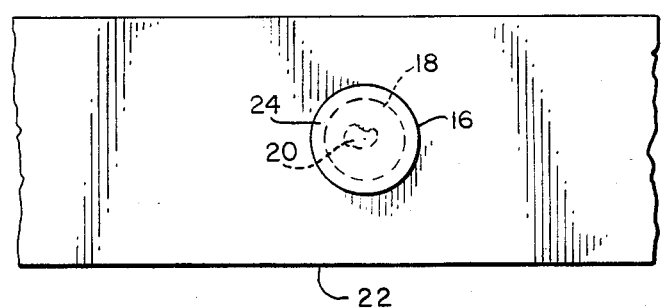
FIG. 3 is a schematic illustration of a patch from the assembly of the invention applied over a hole in a paper web.

In use, the patch layer 16 with barrier layer 18 secured thereto is stripped from carrier layer 12 whereby the adhesive layer 14 is retained on the underside of patch layer 16 surrounding barrier layer 18 whereby there is provided on the underside of layer 16 an adhesively securable area surrounding an adhesive free area. The patch layer/barrier layer assembly is positioned over a web with the adhesive layer 14 and barrier layer 18 facing the web and aligned so that layer 18 is over the hole to be patched. The patch layer/barrier layer assembly is then moved to contact the web so that the barrier layer 18 covers the hole and the assembly is pressed against the web so that it is adhesively secured to the web by adhesive 14. FIG. 3 depicts a patch layer 16 adhesively secured over a hole 20 in a web 22 at an adhesive covered area 24 which surrounds barrier layer 18; the adhesive free surface of layer 18 overlies hole 20 whereby no adhesive is exposed through hole 20. The advantage of no adhesive being exposed through hole 20 is that the web can be coiled without the risk of layers adhering to one another and there is no possibility that the web will adhere to converting or printing machinery at the hole area.

Turning now to the portion of the patch which is adapted to overlie at least the hole being patched with no adhesive being exposed through the hole, this is preferably accomplished as is described in conjunction with the figures of the drawing by including a barrier layer, i.e. an additional layer adhered to the application side of the patch layer. Alternatively in a less preferred mode, the patch comprises a patch layer without a barrier layer and adhesive is only printed on or secured to an area adjacent the borders of the patch layer and the inner area of the underside of the patch layer is left free of adhesive.

Turning now to the materials of construction, the patch layer and barrier layer can be of the same or different material but both must be of material recyclable in a papermaking process. Preferably for purposes of convenience and economy, the patch layer and barrier layer are constructed of the same material.

Suitable materials for the patch layer and the barrier layer include, for example, mechanical or chemical free fiber repulpable paper which can be bleached or unbleached, sized or unsized, white or colored; synthetic fiber paper, e.g. polypropylene fiber paper or combinations of the above; and water soluble or water dispersible film, e.g. polyvinyl alcohol or polyethylene oxide.

Coated paper is a suitable material where the web to be patched is of coated paper. Normally these materials are used in a weight basis of 4 lbs/ream up to board grades up to 9 mils thickness. Preferably, materials are used having a weight basis range from about 4 lbs/ream to about 100 lbs/ream, e.g. lightweight paper. In a preferred product both the patch layer and the barrier layer are made of uncoated 35 lbs/ream weight basis bleached sized groundwood free paper.

Turning now to the release coated carrier, this readily made of any of the release coated carrier materials that are conventionally available including paper or synthetic films or combinations thereof including kraft or groundwood free chemical paper, polyethylene or polypropylene coated paper, polypropylene, polyethylene, polyvinyl chloride or polyester. Release aids for use in providing the release coating include, for example, silicones, chromium complex compounds (e.g. Quilon available from DuPont), stearates, and waxes. Preferably, the carrier layer is silicone coated paper.

Turning now to the adhesive component, this can be any water-soluble or water-dispersible pressure sensitive, heat sealable or remoistenable adhesive.

Suitable pressure sensitive or heat sealable adhesives are normally derived by polymerizing or copolymerizing acrylic acid or acrylates or carboxylic acids. Suitable adhesives of this type include acrylic or acrylate homopolymers or copolymers, and acrylic or acrylate copolymers with dicarboxylic acids. Suitable adhesives include blends of water-soluble polyvinyl carboxylic acid and a compatible hydroxy-polyalkylene permanent elasticizer as described in U.S. Pat. No. 2,838,421; acrylic acid esters copolymerized with acrylic acids as described in U.S. Pat. No. 3,152,940; water-soluble plasticized copolymers of acrylic acid and ether acrylates as described in U.S. Pat. No. 3,441,530; blends of polyvinylmethylether, $C_1$–$C_4$ alkyl half ester of vinyl methyl ether and maleic anhydride, and hydantoin formaldehyde resin as described in U.S. Pat. No. 3,556,835; epoxidized rubbery polymer or copolymer reacted with water-soluble secondary amine as described in U.S. Pat. No. 3,661,874; water dispersible alkanolamine neutralized acrylate vinyl carboxylic acid copolymers as described in U.S. Pat. No. 3,865,770; and water-dispersible acrylate acrylic acid copolymers blended with acidic rosin or rosin derivative, which has been partly neutralized as described in U.S. Pat. No. 4,413,080. The pressure sensitive or heat sealable adhesives can contain besides (co)polymer component tackifiers including rosins, resins, surfactants and glycols. The remoistenable adhesives include, for example, animal glue or starch base adhesives.

A very suitable water dispersible pressure sensitive adhesive comprises 100 parts copolymer consisting of 5 to 40 parts ethyl acrylate monomer and 95 to 60 parts acrylic acid monomer, 100 to 200 parts of polyethylehe glycol monophenyl ether, 0–2 parts monovalent cation hydroxide, and 0.5–3 parts polyfunctional cross-linking agent, e.g. polyamine.

The patch assembly herein is readily assembled by coating an adhesive solution (e.g. containing about 50% to about 80% by weight solvent) onto a web for manufacture of the patch layer, drying the adhesive and laminating the adhesive coated web to a release coated carrier web, e.g. using a reverse roll solvent coater. Alternatively, the adhesive can be coated on the release coated web which is laminated to the web for manufacture of the patch layer whereby the adhesive is transferred to the patch layer web. The laminate is processed in a slitter to provide webs of usable transverse dimension and these are processed in converting machinery wherein the individual patch layer components (e.g. circles) are die cut and the matrix is removed and continuously coiled. The individual barrier layer components are die cut from a separate web (which is not adhesive treated) and are inserted between the adhesive coated surface of the patch layer components and the release coated carrier web and are secured to tne patch layer components by the adhesive to form the patch and provide the adhesive free area which is to overlie the hole to be patched. The assembly can be coiled so as to be marketed in roll form or can be cut into individual sheet assemblies which are stacked.

The patch layer and barrier layer components are preferably circular as described above or elliptical so as to present on attachment a joint which provides minimum chance of interfering with subsequent coating or printing or converting processes. Less preferably the patch layer and barrier layer components can be rectangular or square or hexagonal or octagonal or other desired shape. While it is preferred to have the patch layer and barrier layer components of the same geometrical configuration but of different size, they can if desired be of different geometrical configuration (e.g. the patch layer component could be circular and the barrier layer component square).

While carriers have been described as square or web form, the carrier layer can have other configurations, e.g. it can be rectangular or circular.

The patch can be made to cover an area of, for example, 0.5 square inch to about 100 square inches and if circular can have a diameter ranging, for example, from 0.5 inches to 10 inches. A preferred product includes a circular patch layer of 3 to 6 inches.

While the foregoing describes preferred embodiments, modifications within the scope of the invention will be readily evident to those skilled in the art. Thus the scope of the invention is intended to be defined by the claims.

What is claimed is:

1. Assembly for use in patching holes in a paper web, said assembly comprising
   (a) a release coated carrier,
   (b) a patch being positioned on said carrier and having a lower surface adjacent said carrier which has an exposable adhesive coating surrounding an exposable adhesive free portion adapted to be positioned to overlie at least a hole to be patched,
   said carrier and said patch having peripheries such that at least part of the periphery of the carrier extends beyond the periphery of the patch,
   said patch and said adhesive being recyclable in a papermaking process.

2. Assembly for use in patching holes in a paper web, said assembly comprising
   (a) a release coated carrier,
   (b) a patch having a lower surface adjacent said carrier which has an exposable adhesive coating surrounding an exposable adhesive free portion adapted to be positioned to overlie at least a hole to be patched, said patch comprising a patch layer and an additional layer which is attached over a portion of the underside of the patch layer between the patch layer and the release coated coarrier to present an adhesive free area when the patch is stripped from the release coated carrier, said adhesive free area constituting said exposable adhesive free portion adapted to be positioned to overlie at least a hole to be patched, said patch and said adhesive being recyclable in a papermaking process.

3. Assembly as recited in claim 2 where said patch layer and said additional layer are of lightweight paper.

4. Assembly as recited in claim 3 wherein the adhesive coating is of pressure sensitive adhesive.

5. Method for patching a hole in a paper web comprising the steps of
   (a) providing patch means having an underside with an exposed adhesive coated area surrounding a non adhesive area,
   (b) positioning the patch means opposite said web with its underside toward said web and aligning said non adhesive area over the hole to be patched, and
   (c) pressing said patch means against said web to cover said hole so that the patch means is adhesively secured to said web and said non adhesive area covers said hole.

6. Method as recited in claim 5 wherein said non adhesive area is provided by a barrier layer which forms part of the underside of said patch means.

7. Method as recited in claim 6 where said patch means is recyclable in a papermaking process.

8. Method as recited in claim 7 wherein said patch means comprises paper which is repulpable.

9. Method as recited in claim 8 wherein said adhesive is water soluble or water dispersible.

10. Method as recited in claim 9 wherein said adhesive is a pressure sensitive adhesive.

* * * * *